(12) United States Patent
Tsai et al.

(10) Patent No.: US 9,065,372 B2
(45) Date of Patent: Jun. 23, 2015

(54) MULTI-DRIVING DEVICE AND DRIVING CIRCUIT THEREOF

(71) Applicant: INDUSTRIAL TECHNOLOGY RESEARCH INSTITUTE, Hsinchu (TW)

(72) Inventors: Jian-Feng Tsai, Kaohsiung (TW); Yong-Kai Lin, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 253 days.

(21) Appl. No.: 13/906,709

(22) Filed: May 31, 2013

(65) Prior Publication Data

US 2014/0117885 A1    May 1, 2014

(30) Foreign Application Priority Data

Oct. 30, 2012   (TW) .............................. 101140095 A
Apr. 1, 2013    (TW) .............................. 102111726 A

(51) Int. Cl.
*H02P 1/54*      (2006.01)
*H02P 5/74*      (2006.01)
*H02M 1/00*      (2007.01)

(52) U.S. Cl.
CPC ........... *H02P 5/74* (2013.01); *H02M 2001/008* (2013.01)

(58) Field of Classification Search
USPC .................. 318/34, 51, 66, 632, 113, 400.27
See application file for complete search history.

(56) References Cited

U.S. PATENT DOCUMENTS

| 4,476,408 A | 10/1984 | Honsinger |
| 5,341,075 A | 8/1994 | Cocconi |
| 5,549,172 A | 8/1996 | Mutoh et al. |

(Continued)

FOREIGN PATENT DOCUMENTS

| CN | 102664577 A | 9/2012 |
| TW | 401923 | 8/2000 |

(Continued)

OTHER PUBLICATIONS

Itoh Jun-Ichi et al., Square-Wave Operation for a Single-Phase-PFC Three-Phase Motor System Without a Reactor, IEEE Transactions on Industry Aplications, Mar./Apr. 2011, pp. 805-811.

(Continued)

*Primary Examiner* — Bentsu Ro
*Assistant Examiner* — Iftekhar Mustafa
(74) *Attorney, Agent, or Firm* — Muncy, Geissler, Olds & Lowe, P.C.

(57) ABSTRACT

A driving circuit comprises three switch groups, each comprising a first switch, a second switch, a third switch and a fourth switch. The first and the second switches are coupled in series. The third switch is serially coupled to the fourth switch and coupled between the first and the second switches. An $i^{th}$ inductor of a first driving device is coupled between the third and the fourth switches, wherein i ranges between 1~3. In high speed mode, the first and the third switches of one of the switch groups are turned on, the second and the fourth switches are turned off, the first and the third switches of another of the switch groups are turned off, the second switch is turned on, and the fourth switch is turned on or off to raise voltage of the a driving device.

20 Claims, 19 Drawing Sheets

(56) References Cited

U.S. PATENT DOCUMENTS

| | | | |
|---|---|---|---|
| 6,806,687 B2 | 10/2004 | Kajiura | |
| 7,199,535 B2 | 4/2007 | Welchko et al. | |
| 7,337,863 B2 | 3/2008 | Griesmeier et al. | |
| 7,475,747 B2 | 1/2009 | Plishner | |
| 7,579,792 B2 | 8/2009 | Nagashima et al. | |
| 7,643,319 B2 * | 1/2010 | Wagoner | 363/65 |
| 7,747,363 B1 | 6/2010 | Tang | |
| 7,800,260 B2 | 9/2010 | Komatsu et al. | |
| 7,836,985 B2 | 11/2010 | Itoh | |
| 7,851,954 B2 | 12/2010 | Endo et al. | |
| 8,089,780 B2 * | 1/2012 | Mochikawa et al. | 363/17 |
| 2004/0012350 A1 * | 1/2004 | Weinmann | 318/110 |
| 2004/0140779 A1 * | 7/2004 | Diesner et al. | 318/34 |
| 2005/0189904 A1 | 9/2005 | Wills et al. | |
| 2006/0043916 A1 | 3/2006 | Henslee et al. | |
| 2006/0152085 A1 | 7/2006 | Flett et al. | |
| 2009/0284079 A1 * | 11/2009 | Jahkonen | 307/82 |
| 2010/0222953 A1 | 9/2010 | Tang | |
| 2011/0101817 A1 | 5/2011 | Hao et al. | |

FOREIGN PATENT DOCUMENTS

| | | |
|---|---|---|
| TW | I258436 | 7/2006 |
| TW | I281965 | 6/2007 |
| TW | M335422 | 7/2008 |
| TW | I336160 | 1/2011 |
| TW | M415226 | 11/2011 |
| WO | WO2012/086095 A1 | 6/2012 |

OTHER PUBLICATIONS

Pellegrino, Gianmario et al., An Integral Battery Charger With Power Factor Correction for Electric Scooter, IEEE Transactions on Power Electronics, Mar. 2010, pp. 751-759.

Itoh, Jun-Ichi et al., Investigation of a Two-stage Boost Converter using the Neutral Point of a Motor, The 2010 International Power Electronics Conference, 2010, pp. 1189-1194.

Itoh, Jun-Ichi et al., Loss Evaluation of a Two-stage Boost Converter Using the Neutral Point of a Motor, IEEE, 2010 pp. 2600-2606.

Chiang, Goh Teck et al., A High Efficient Three-phase AC Motor Drive Converter that Utilized the Neutral Point of a Motor, PEDS, 2009, pp. 783-788.

Chiangm Goh Teck et al., A Three-Port Interface Converter by Using a Indirect Matrix Converter with the Neutral Point of the Motor, IEEE, 2009, pp. 3282-3289.

* cited by examiner

MULTI-DRIVING DEVICE AND DRIVING CIRCUIT THEREOF

This application claims the benefit of Taiwan application Serial No. 101140095, filed Oct. 30, 2012, the disclosure of which is incorporated by reference herein in its entirety, and claims the benefit of Taiwan application Serial No. 102111726, filed Apr. 1, 2013, the disclosure of which is incorporated by reference herein in its entirety.

TECHNICAL FIELD

The disclosure relates in general to a driving circuit and a multi-driving device using the same, and more particularly to a driving circuit capable of improving its performance in a high speed and a multi-driving device using the same.

BACKGROUND

Normally, a conventional driving device consists of a high speed motor and a low speed motor to increase the performance at both low speed and high speed. However, when the conventional driving device is operated in a high speed, the driving device normally uses the high speed motor only; hence, making the low speed motor idled. Therefore, when the driving device is operated in a high speed, the low speed motor is like a dummy, and the use of the low speed motor is restricted.

SUMMARY

The disclosure is directed to a driving circuit and a multi-driving device using the same. In an embodiment, the application of low speed motor can be extended and the high speed performance of the multi-driving device can be improved.

According to one embodiment, a multi-driving device is provided. The multi-driving device comprises a first driving device, a second driving device and a driving circuit. The first driving device comprises n inductors. The driving circuit is coupled to the first driving device and the second driving device, and comprises n switch groups coupled in parallel, wherein n is a positive integer larger than 3. Each switch group comprises a first switch, a second switch, a third switch and a fourth switch. The first switch and the second switch are coupled in series. The third switch is serially coupled to the fourth switch and coupled between the first switch and the second switch. An $i^{th}$ inductor of the first driving device is coupled between the third switch and the fourth switch, wherein i ranges between 1 and n. In a low speed mode, each first switch and each second switch are turned on. In a high speed mode, the first switch and the third switch of a first one of the n switch groups are turned on, the second switch and the fourth switch of the first one of the n switch groups are turned off, the first switch and the third switch of a second one of the n switch groups are turned off, the second switch one of the second one of the n switch groups is turned on, and the fourth switch one of the second one of the n switch groups is selectively turned on or off so as to raise the voltage of the second driving device.

According to another embodiment, a driving circuit is provided. The driving circuit is coupled to the first driving device and the second driving device. The first driving device comprises n inductors, wherein n is a positive integer larger than 3. The driving circuit comprises n switch groups coupled in parallel. Each switch group comprises a first switch, a second switch, a third switch and a fourth switch. The first switch and the second switch are coupled in series. The third switch is serially coupled to the fourth switch and coupled between the first switch and the second switch. An $i^{th}$ inductor of the first driving device is coupled between the third switch and the fourth switch, wherein i ranges between 1 and n. In a low speed mode, each first switch and each second switch are turned on. In a high speed mode, the first switch and the third switch of a first one of the n switch groups are turned on, the second switch and the fourth switch of the first one of the n switch groups are turned off, the first switch and the third switch of a second one of the n switch groups are turned off, the second switch of the second one of the n switch groups are turned on, and the fourth switch of the second one of the n switch groups is selectively turned on or off so as to raise the voltage of the second driving device.

According to one embodiment, a multi-driving device is provided. The multi-driving device comprises a first driving device, a second driving device and a driving circuit. The first driving device comprises n inductors. The driving circuit is coupled to the first driving device and the second driving device and comprises n switch groups coupled in parallel, wherein each switch group comprises a first switch, a second switch, a third switch and a fourth switch, the first switch and the second switch are coupled in series, the third switch is serially coupled to the fourth switch and coupled between the first switch and the second switch, an ith inductor of the first driving device is coupled between the third switch and the fourth switch, and i ranges between 1 and n. In a low speed mode, the first switch and the second switch of a first one of the n switch groups are turned on, the first switch of a second one of the n switch groups is turned off, the second switch of the second one of the n switch groups is turned on, the first switch of a third one of the n switch groups is turned off, and the second switch of the third one of the n switch groups is turned on. in a high speed mode, the first switch of the first one of the n switch groups is turned on, the second switch of the first one of the n switch groups is turned off, the third switch of the first one of the n switch groups is turned on, the fourth switch of the first one of the n switch groups is turned off, the first switch of the second one of the n switch groups is turned off, and the first switch of the third one of the n switch groups is turned off; by controlling at least one of the fourth switch of the second one of the n switch groups and the fourth switch of the third one of the n switch groups to be turned on or off through a signal, so as to raise the voltage of the second driving device.

According to another embodiment, a driving circuit is provided. The driving circuit is coupled to a first driving device and a second driving device and comprises n switch groups coupled in parallel, wherein each switch group comprises a first switch, a second switch, a third switch and a fourth switch, the first switch and the second switch are coupled in series, the third switch is serially coupled to the fourth switch and coupled between the first switch and the second switch, an ith inductor of the first driving device is coupled between the third switch and the fourth switch, and i ranges between 1 and n. In a low speed mode, the first switch and the second switch of a first one of the n switch groups are turned on, the first switch of a second one of the n switch groups is turned off, the second switch of the second one of the n switch groups is turned on, the first switch of a third one of the n switch groups is turned off, and the second switch of the third one of the n switch groups is turned on. in a high speed mode, the first switch of the first one of the n switch groups is turned on, the second switch of the first one of the n switch groups is turned off, the third switch of the first one of the n switch groups is turned on, the fourth switch of the first one of the n switch groups is turned off, the first switch of the second one of the n switch groups is turned off, and the first switch of the third one of the n switch groups is turned off; by controlling at least one of the fourth switch of the second one of the n switch groups and the fourth switch of the third one of the n switch groups to be turned on or off through a signal, so as to raise the voltage of the second driving device.

The above and other aspects of the disclosure will become better understood with regard to the following detailed description of the non-limiting embodiment(s). The following description is made with reference to the accompanying drawings.

BRIEF DESCRIPTION OF THE DRAWINGS

FIG. 3A shows a current path diagram of a driving circuit when the multi-driving device of FIG. 1A is operated in a high speed and a fourth switch is turned on;

Figure 1A:
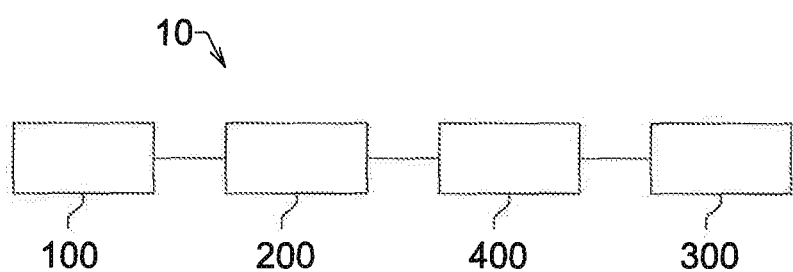
FIG. 1A shows a functional block diagram of a multi-driving device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1A, a functional block diagram of a multi-driving device according to an embodiment of the disclosure is shown. The multi-driving device 10, such as a transport, machine tool, or other devices requiring output power, comprises a first driving device 100, a driving circuit 200, a second driving device 300 and a driving circuit 400.

Figure 1B:
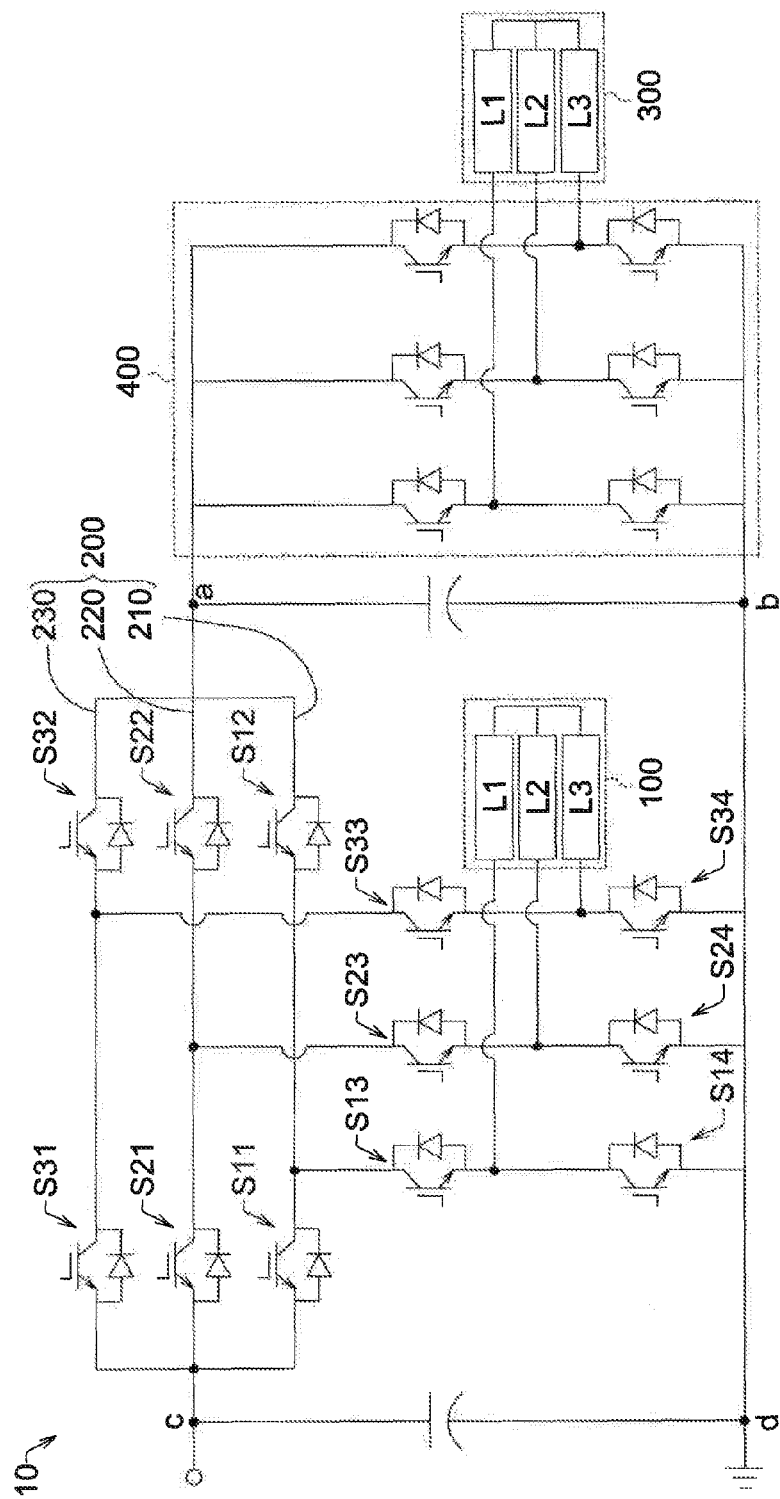
FIG. 1B shows a circuit diagram of the multi-driving device of FIG. 1A.

Referring to FIG. 1B, a circuit diagram of the multi-driving device of FIG. 1A is shown. The first driving device 100 is coupled to the second driving device 300 through the driving circuits 200 and 400. The first driving device 100, such as a three-phase motor, comprises a first inductor L1, a second inductor L2 and a third inductor L3. The first driving device 100 can also be realized by a driving device comprising an inductor. The variety of second driving device 300 can be similar to that of the first driving device 100. Besides, the inductance of the second driving device 300 and that of the first driving device 100 can be the same or different.

The driving circuit 200, coupled to the first driving device 100, comprises a first switch group 210, a second switch group 220 and a third switch group 230 which are coupled in parallel.

Figure 1C:
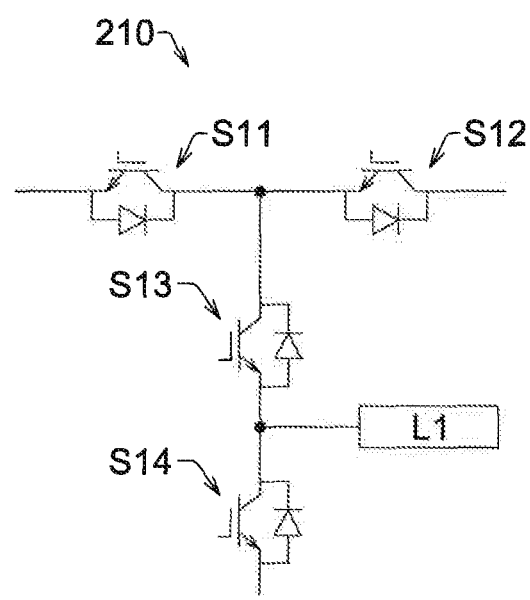
FIG. 1C shows a circuit diagram of a first switch group of FIG. 1B.

Referring to FIG. 1C, a circuit diagram of a first switch group of FIG. 1B is shown. The first switch group 210 comprises a first switch S11 and a second switch S12, which are coupled in series, and a third switch S13 and a fourth switch S14, which are coupled in series. The third switch S13 is coupled between the first switch S11 and the second switch S12, and the first inductor L1 of the first driving device 100 is coupled between the third switch S13 and the fourth switch S14.

Return to FIG. 1B. Like the first switch group 210, the second switch group 220 comprises a first switch S21 and a second switch S22, which are coupled in series, and a third switch S23 and a fourth switch S24, which are coupled in series. The third switch S23 is coupled between the first switch S21 and the second switch S22, and the second inductor L2 of the first driving device 100 is coupled between the third switch S23 and the fourth switch S24.

As indicated in FIG. 1B, like the first switch group 210, the third switch group 230 comprises a first switch S31 and a second switch S32, which are coupled in series, and a third switch S33 and a fourth switch S34, which are coupled in series. The third switch S33 is coupled between the first switch S31 and the second switch S32, and the third inductor L3 of the first driving device 100 is coupled between the third switch S23 and the fourth switch S34.

In terms of the variety of switches, the first switch, the second switch, the third switch and the fourth switch are realized by such as relays, metal oxide semiconductor field effect transistors (MOSFET), insulated gate bipolar transistors (IGBT) or other suitable switch components. At least two of the first switch, the second switch, the third switch and the fourth switch can have the same or different varieties. For example, the switches which are turned off (that is, the first switches S21 and S31 and the second switches S12 and S32) when operated in a high speed (elaborated below) can be realized by relays, and other switches can be realized by MOSFET, IGBT or a combination thereof.

Figure 2:
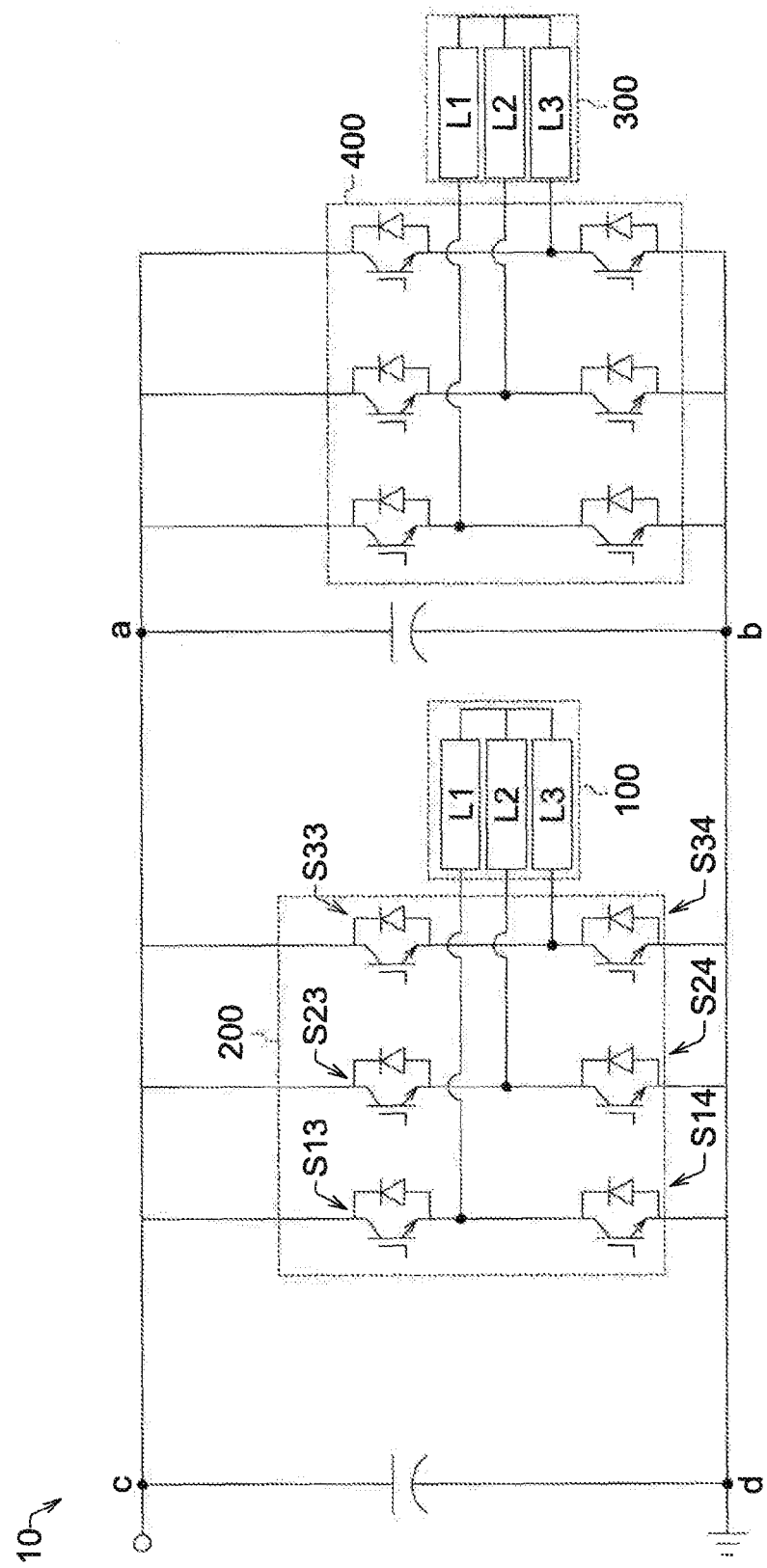
FIG. 2 shows an equivalent circuit diagram of a driving circuit when the multi-driving device of FIG. 1A is operated in a low speed.

Referring to FIG. 2, an equivalent circuit diagram of a driving circuit when the multi-driving device of FIG. 1A is operated in a low speed is shown. When the multi-driving device is operated in a low speed, all of the first switches S11, S21 and S31 and all of the second switch S21, S22 and S32 are turned on, such that the circuit structure of the driving circuit 200 of FIG. 2 is identical to the circuit structure of the driving circuit 400 for driving the second driving device 300. The voltage difference from node a to node b is equal to the voltage difference from node c to node d. The input power (the voltage difference from node c to node d) is directly transmitted to the driving circuit 400 through the driving circuit 200 so that the driving circuit 400 can drive the second driving device 300 with the received input power.

Figure 3A:
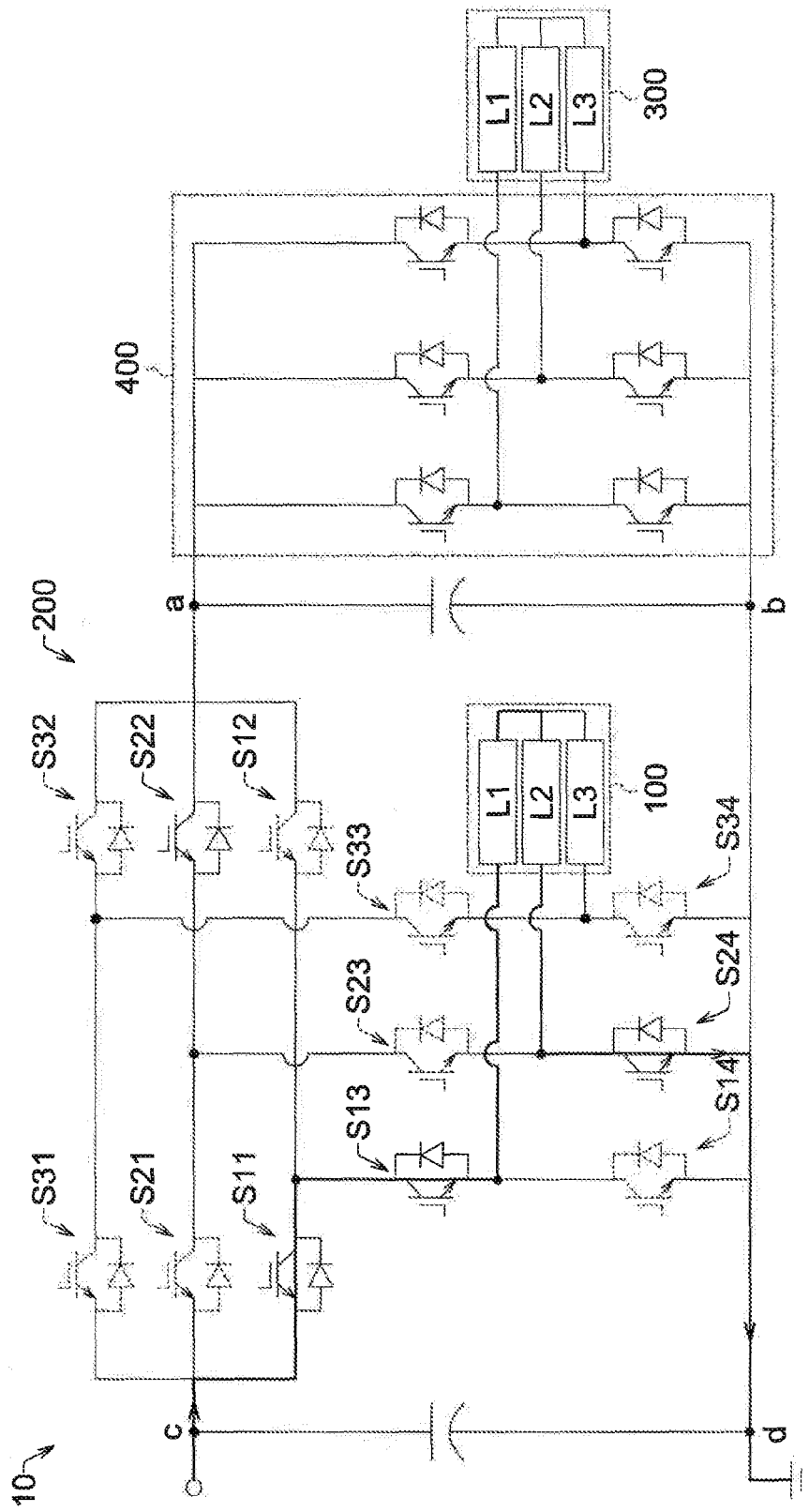

Referring to FIG. 3A, a current path diagram of a driving circuit when the multi-driving device of FIG. 1A is operated in a high speed and a fourth switch is turned on is shown. When the multi-driving device 10 is operated in a high speed, in terms of the control of the first switch group 210, the first switch S11 and the third switch S13 are turned on and the second switch S12 and the fourth switch S14 are turned off; in terms of the control of the second switch group 220, the first switch S21 and the third switch S23 are turned off, the second switch S22 is turned on, and the fourth switch S24 is selectively turned on or off. When the fourth switch S24 is turned on, as indicated in FIG. 3A, the current path (denoted by bold lines) passes through the first switch S11 and the third switch S13 of the first switch group 210, the first inductor L1 and the second inductor L2 of the first driving device 100 and the fourth switch S24 of the second switch group 220 for coupling the first inductor L1 and the second inductor L2 in series.

Figure 3B:
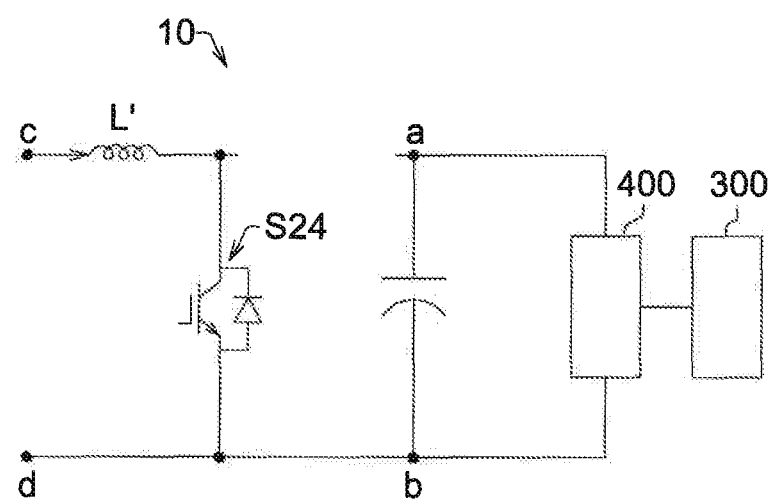
FIG. 3B shows an equivalent circuit diagram of the driving circuit of FIG. 3A.

Referring to FIG. 3B, an equivalent circuit diagram of the driving circuit of FIG. 3A is shown. When the multi-driving device 10 is operated in a high speed and the fourth switch S24 is turned on, the inductor L' is charged, wherein the inductance of the inductor L' is equal to the equivalent inductance of the first inductor L1 and the second inductor L2 which are coupled in series.

Figure 4A:
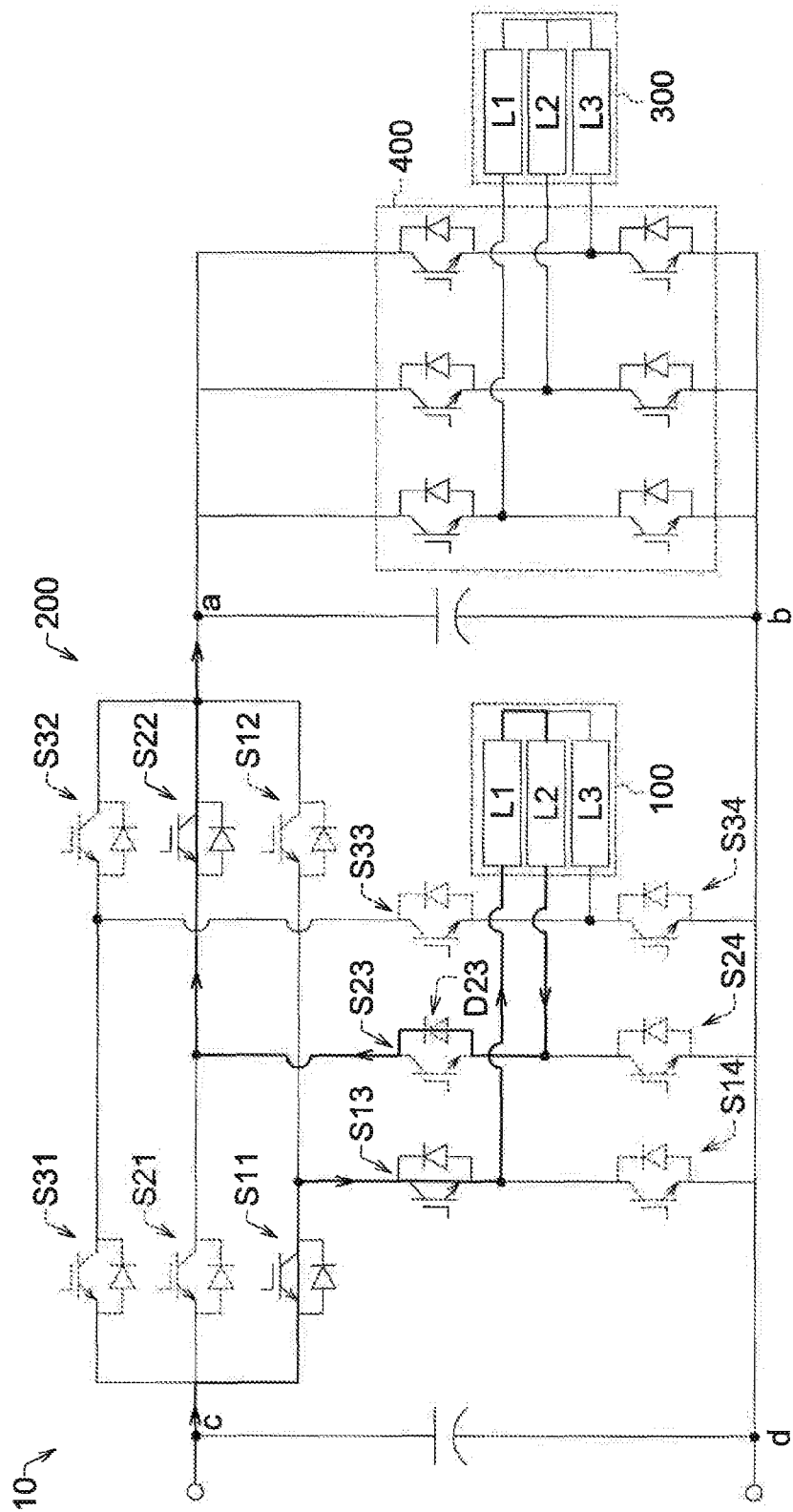
FIG. 4A shows a current path diagram of a driving circuit when the multi-driving device of FIG. 1A is operated in a high speed and the fourth switch turned off.

Referring to FIG. 4A, a current path diagram of a driving circuit when the multi-driving device of FIG. 1A is operated in a high speed and the fourth switch turned off is shown. When the multi-driving device 10 is operated in a high speed and the fourth switch S24 is turned off, the current path (denoted by bold lines) passes through the first switch S11 and the third switch S13 of the first switch group 210, the first inductor L1 and the second inductor L2 of the first driving device 100, and the diode D23 of the third switch S23 and the second switch S22 of the second switch group 220 to raise the voltage of node a. Since the second driving device 300 is coupled to the driving circuit 200, the voltage of the second driving device 300 can be raised. To put it in greater details, due to the design of the driving circuit 200, the voltage can be raised through the inductor of the first driving device 100, so that the second driving circuit 400 can be provided with a higher voltage for driving the second driving device 300 and increasing its rotation speed when the second driving device 300 is operated in a high speed mode.

Figure 4B:
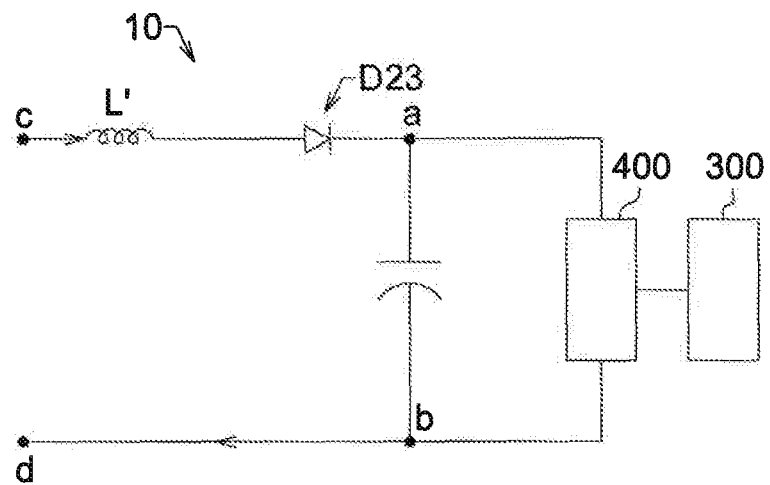
FIG. 4B shows an equivalent circuit diagram of the driving circuit of FIG. 4A.

Referring to FIG. 4B, an equivalent circuit diagram of the driving circuit of FIG. 4A is shown. When the multi-driving device 10 is operated in a high speed and the fourth switch S24 is turned off, an inductor L' charges the driving circuit 400 and raises its voltage. Meanwhile, the voltage difference from node a and node b is larger than the voltage difference from node c and node d. The driving circuit 400 drives the second driving device 300 with the voltage-raised power.

Figure 5:
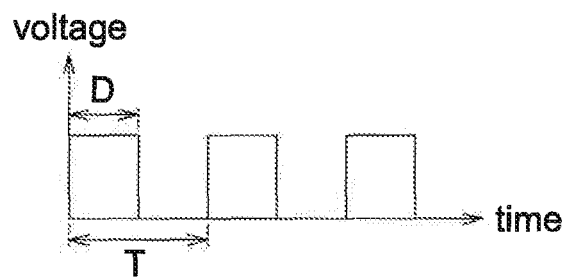
FIG. 5 shows a control signal of the fourth switch according to an embodiment of the disclosure.

Referring to FIG. 5, a control signal of the fourth switch according to an embodiment of the disclosure is shown. Whether the fourth switch S24 is turned on or off is controlled by a pulse-width modulation (PWM) signal. The voltage Vab is determined by the pulse-width proportion P and the voltage Vcd as illustrated in formulas (1). The pulse-width proportion P denotes the proportion of the pulse-width D to the period T (P=D/T). The voltage Vcd denotes the voltage difference from node c and node d and is realized by such as the battery voltage of the multi-driving device 10. The voltage Vab denotes the voltage difference node a to node b.

$$Vab = Vcd/(1-P) \qquad (1)$$

Figure 6A:
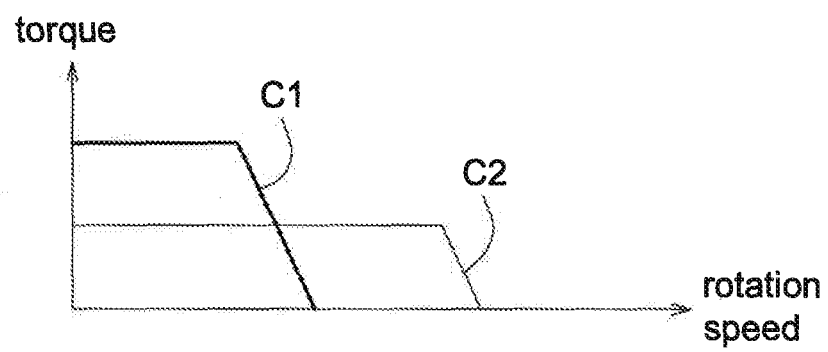
FIG. 6A shows a torque vs. rotation speed performance diagram of a first driving device and a second driving device of FIG. 1A.
Figure 6B:
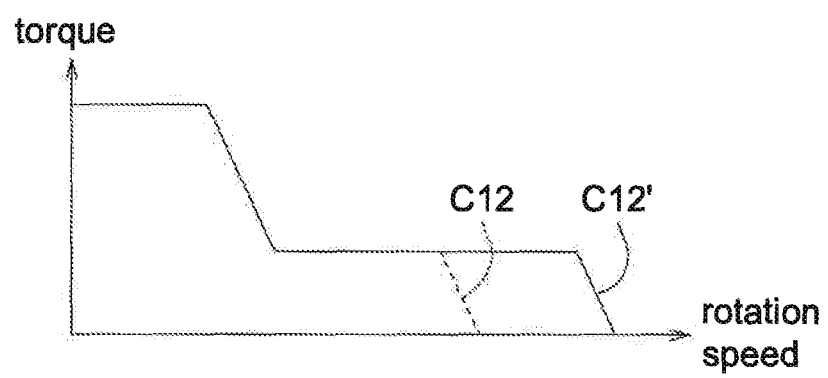
FIG. 6B shows a torque vs. rotation speed synthetic performance diagram of the first driving device and the second driving device of FIG. 6A.

Referring to FIGS. 6A and 6B. FIG. 6A shows a torque vs. rotation speed performance diagram of a first driving device and a second driving device of FIG. 1A. FIG. 6B shows a torque vs. rotation speed synthetic performance diagram of the first driving device and the second driving device of FIG. 6A. As indicated in FIG. 6A, curve C1 represents the torque vs. rotation speed performance curve of the first driving device 100, and curve C2 represents the torque vs. rotation speed performance curve of the second driving device 300. In the present example, the first driving device 100 is exemplified by a low speed motor, and the second driving device 300 is exemplified by a high speed motor. When the driving circuit 200 is omitted, curves C1 and C2 are combined as curve C12 of FIG. 6B. When the multi-driving device 10 uses the driving circuit 200, curves C1 and C2 are combined as curve C12' of FIG. 6B. It is evident that the rotation speed of the multi-driving device 10 operated in a high speed mode is further increased.

In the above embodiments, the current path passes through the first switch group 210 and the second switch group 220 for coupling the first inductor L1 and the second inductor L2 in series. However, the current path may pass through any two of the first switch group 210, the second switch group 220 and the third switch group 230 for coupling two corresponding inductors in series as long as the following conditions are satisfied: (1) the first switch and the third switch of one of the first switch group 210, the second switch group 220 and the third switch group 230 are turned on, and the second switch and the fourth switch are turned off; (2) the first switch and the third switch of another of the first switch group 210, the second switch group 220 and the third switch group 230 are turned off, the second switch is turned on, and the fourth switch is selectively turned on or off.

Figure 7:
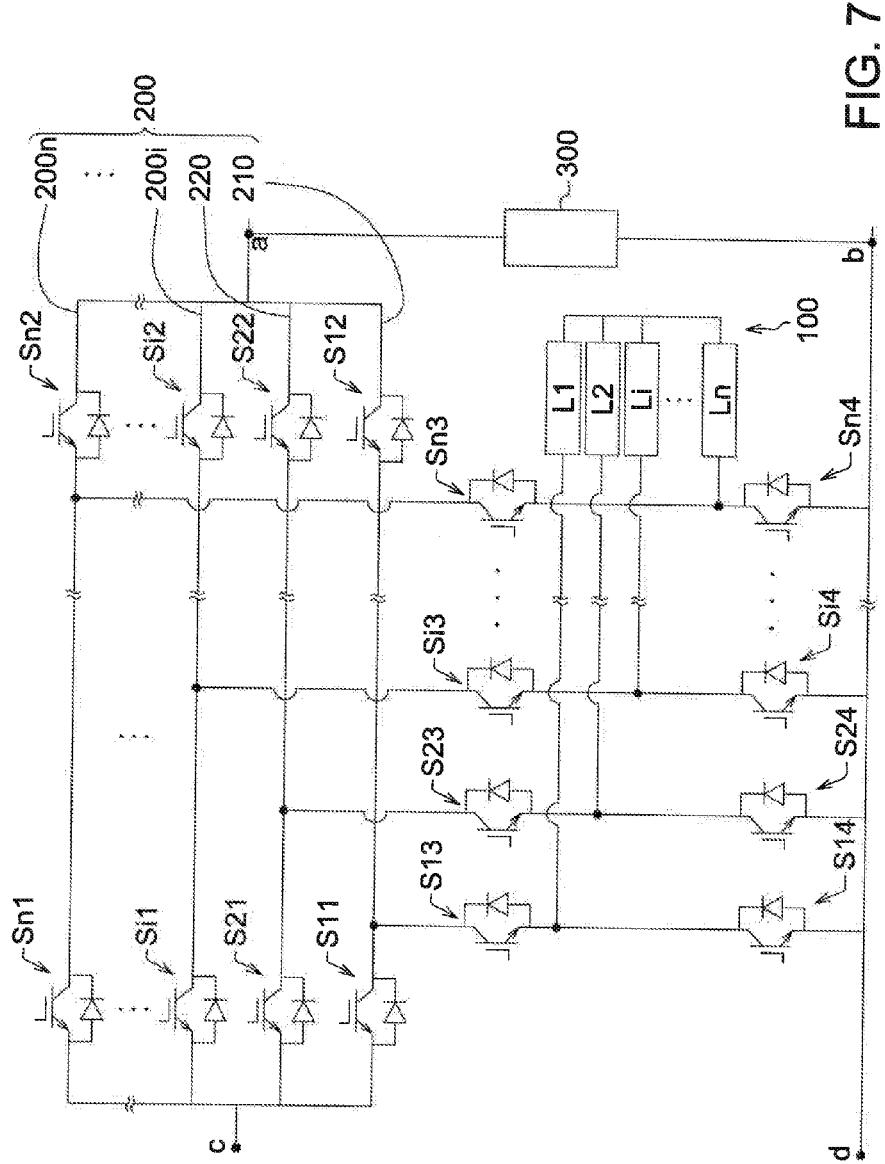
FIG. 7 shows a circuit diagram of a driving circuit of a multi-driving device according to another embodiment of the disclosure.

Referring to FIG. 7, a circuit diagram of a driving circuit of a multi-driving device according to another embodiment of the disclosure is shown. In the present example, the driving circuit 200 is coupled to the first driving device 100, and comprises n switch groups coupled in parallel, wherein n is a positive integer equal to or larger than 3. For example, the driving circuit 200 comprises a first switch group 210, a second switch group 220, ..., an $i^{th}$ switch group $200i$, ..., and an $n^{th}$ switch group $200n$. The first driving device 100 is realized by such as an n-phase motor for coupling each switch group of the driving circuit 200.

As indicated in FIG. 7, the $i^{th}$ switch group $200i$ comprises a first switch Si1, a second switch Si2, a third switch Si3 and a fourth switch Si4. The first switch Si1 and the second switch Si2 are coupled in series, the third switch Si3 is serially coupled to the fourth switch Si4 and coupled between the first switch Si1 and the second switch Si2, wherein i ranges between 1 and n. In an example, the first switch group 210 comprises a first switch S11, a second switch S12, a third switch S13 and a fourth switch S14, wherein the first switch S11 and the second switch S12 are coupled in series, the third switch S13 is serially coupled to the fourth switch S14 and coupled between the first switch S11 and the second switch S12. In another example, the $n^{th}$ switch groups $200n$ comprises a first switch Sn1, a second switch Sn2, a third switch Sn3 and a fourth switch Sn4, wherein the first switch Sn1 and the second switch Sn2 are coupled in series, and the third switch Sn3 is serially coupled to the fourth switch Sn4 and coupled between the first switch Sn1 and the second switch Sn2.

As indicated in FIG. 7, an inductor of the first driving device 100 is coupled between the third switch Si3 and the fourth switch Si4 of the $i^{th}$ switch group $200i$, wherein i ranges between 1 and n. In an example, the first inductor of the first driving device 100 is coupled between the third switch S13 and the fourth switch S14 of the first switch group 210. In another example, the $n^{th}$ inductor of the first driving device 100 is coupled between the third switch Sn3 and the fourth switch Sn4 of the $n^{th}$ switch groups $200n$.

For the driving circuit of another embodiment, in a low speed mode, the first switch and the second switch the first one of the n switch groups are turned on, the first switch of the second one of the n switch groups is turned off, the second switch of the second one of the n switch groups is turned on, the first switch of the third one of the n switch groups is turned off, and the second switch of the third one of the n switch groups is turned on. In a high speed mode, the first switch of the first one of the n switch groups is turned on, the second switch of the first one of the n switch groups is turned off, the third switch of the first one of the n switch groups is turned on, the fourth switch of the first one of the n switch groups is turned off, the first switch of the second one of the n switch groups is turned off, and the first switch of the third one of the n switch groups is turned off; by controlling at least one of the fourth switch of the second one of the n switch groups and the fourth switch of the third one of the n switch groups to be turned on or off through a signal, so as to raise the voltage of the second driving device. Some embodiments are disclosed below for elaborating.

Figure 8:
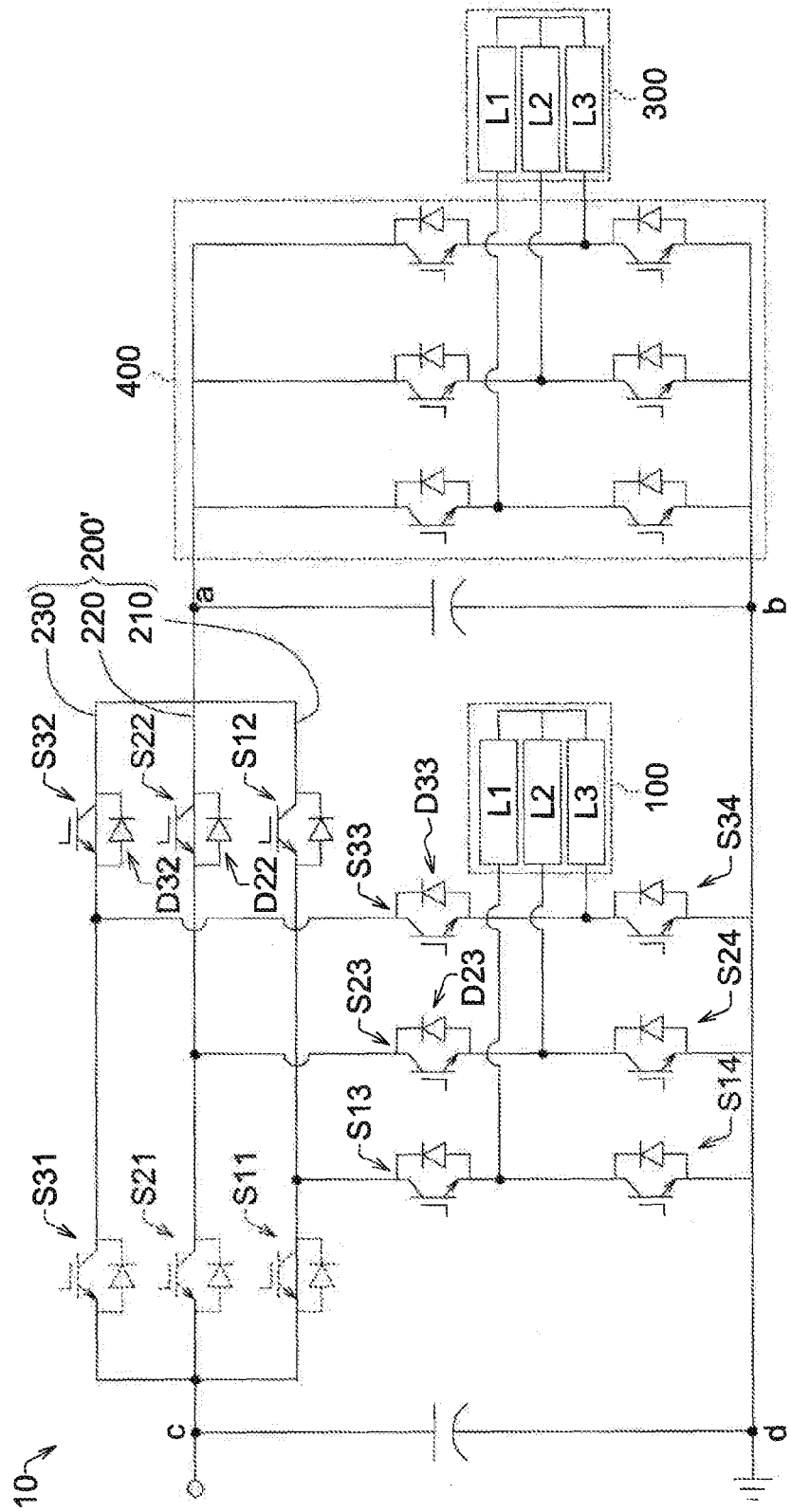
FIG. 8 shows a circuit diagram of a multi-driving device according to another embodiment of the disclosure.

Referring to FIG. 8, a circuit diagram of a multi-driving device according to another embodiment of the disclosure is shown. A multi-driving device 10', such as a transport, machine tool, or other devices requiring output power, comprises a first driving device 100, the driving circuit 200', the second driving device 300 and the driving circuit 400. In comparison with the above driving circuit, whether the driving circuit of present embodiment is in the low speed mode or in the high speed mode, the first switch S11 of the first switch group 210 is turned on, the first switch S21 of the second switch group 220 is turned off, the first switch S21 of the third switch group 230 is turned off, and other switch can be turned on or off depends on the low speed mode or the high speed mode.

Figure 9:
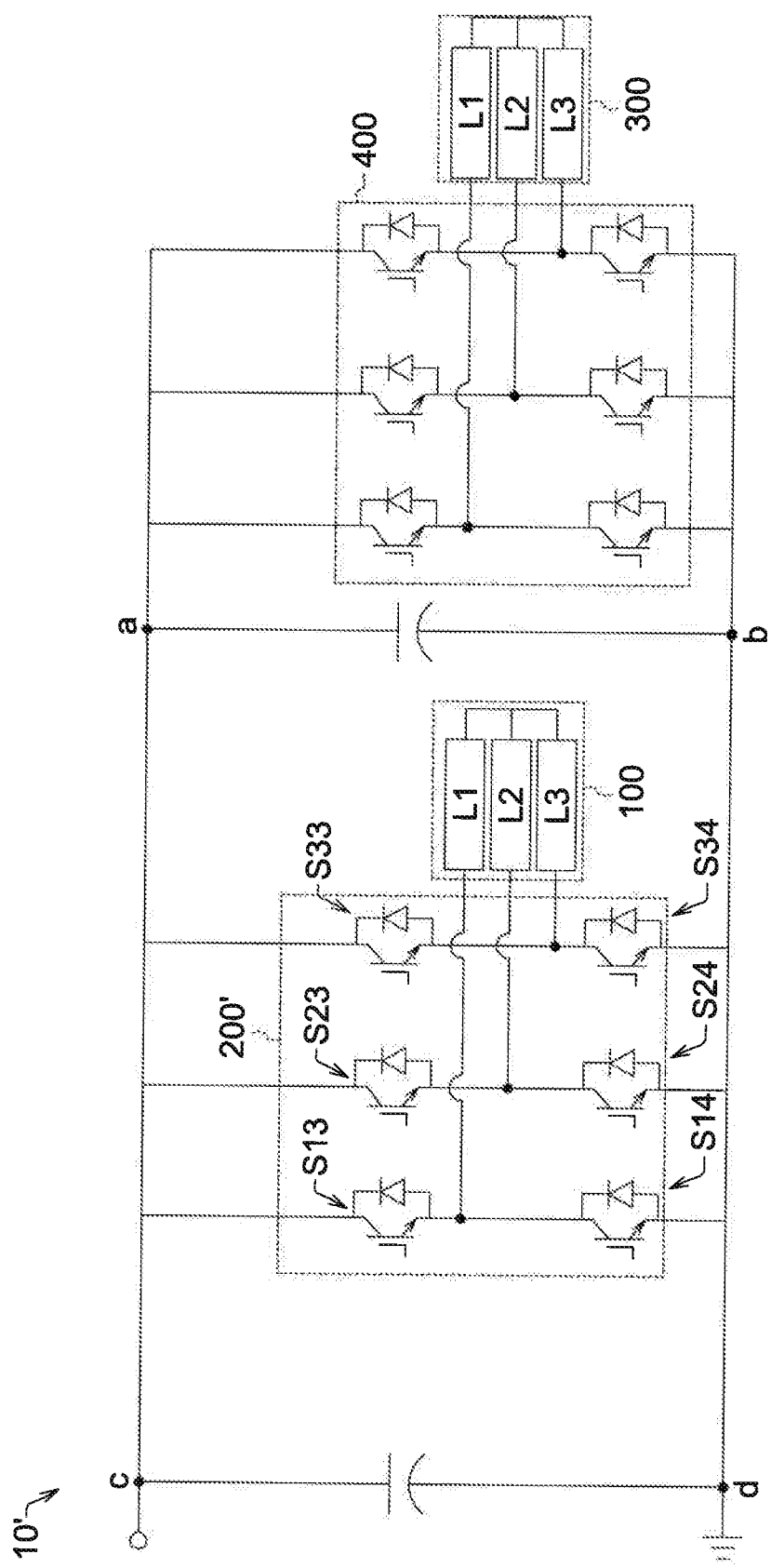
FIG. 9 shows an equivalent circuit diagram of the driving circuit when the multi-driving device of FIG. 8 is operated in the low speed.

Referring to FIG. 9, an equivalent circuit diagram of the driving circuit when the multi-driving device of FIG. 8 is operated in the low speed. When the multi-driving device 10' is operated in the low speed, the first switch S11 and the second switch S12 of the first switch group 210 are turned on, the first switch S21 of the second switch group 220 is turned off, the second switch S22 of the second switch group 220 is turned on, the first switch S31 of the third switch group 230 is turned off, and the second switch S32 of the third switch group 230 is turned on. As a result, the circuit structure of the driving circuit 200' is equivalent to that of the driving circuit 400 of the second driving device 300, wherein the voltage difference from node a to node b is equal to the voltage difference from node c to node d. The input power (the voltage difference from node c to node d) is directly transmitted to the driving circuit 400 through the driving circuit 200 so that the driving circuit 400 can drive the second driving device 300 with the received input power.

Figure 10:
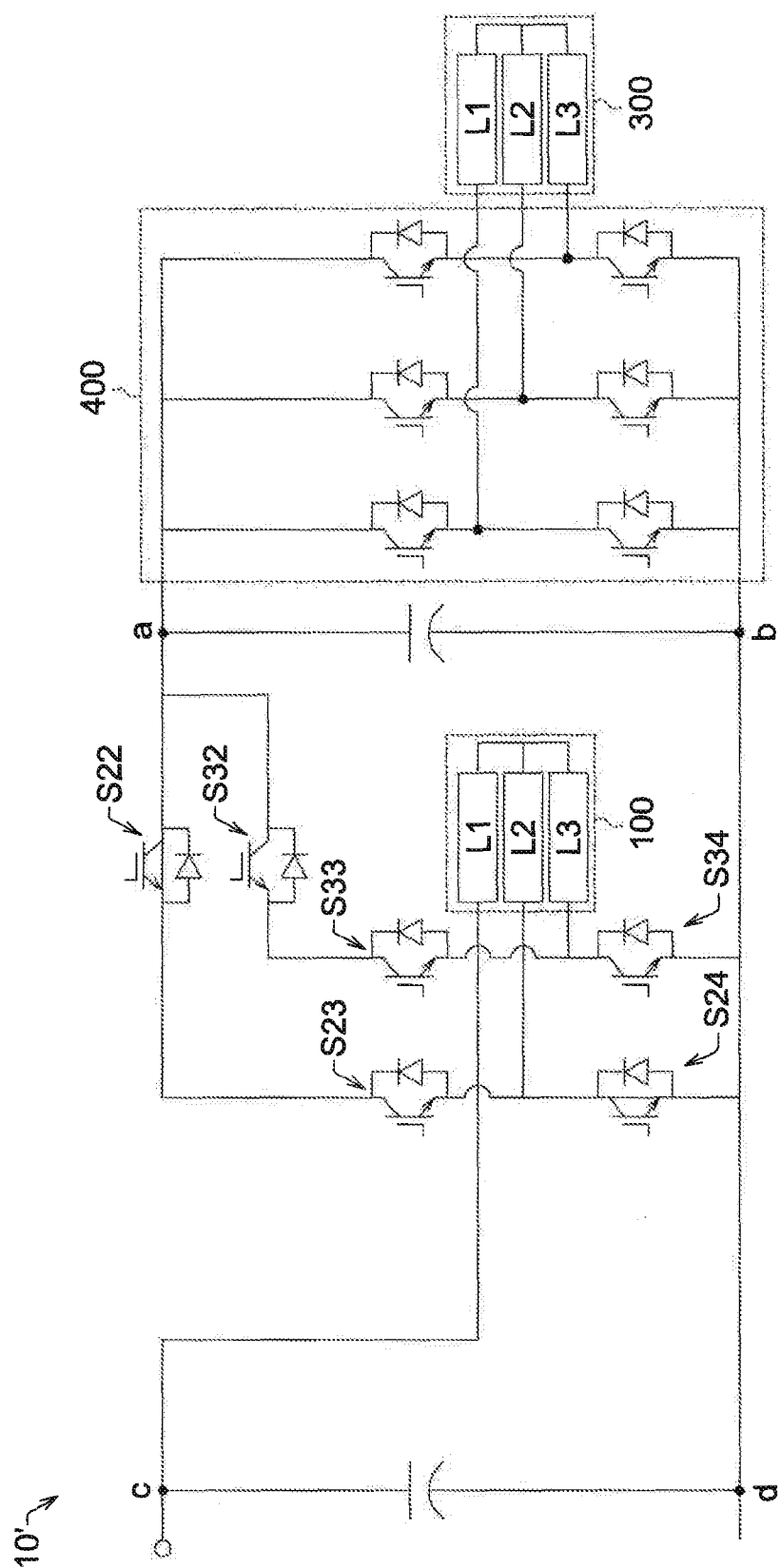
FIG. 10 shows an equivalent circuit diagram of the driving circuit when the multi-driving device of FIG. 8 is operated in the high speed.

Referring to FIG. 10, an equivalent circuit diagram of the driving circuit when the multi-driving device of FIG. 8 is operated in the high speed. When the multi-driving device 10' is operated in the high speed, the first switch S11 of the first switch group 210 is turned on, the second switch S12 of the first switch group 210 is turned off, the third switch S13 of the first switch group 210 is turned on, the fourth switch S14 of the first switch group 210 is turned off, the first switch S21 of the second switch group 220 is turned off, the first switch S31 of the third switch group 230 is turned off, the fourth switch S24 of the second switch group 220 and the fourth switch S34 of the third switch group 230 are controlled by PWMs, so as to raise the voltage of the second driving device 300. Different current property can be obtained by at least one of the fourth switch S24 of the second switch group 220 and the fourth switch S34 of the third switch group 230. Some embodiments are disclosed below for elaborating.

Figure 11A:
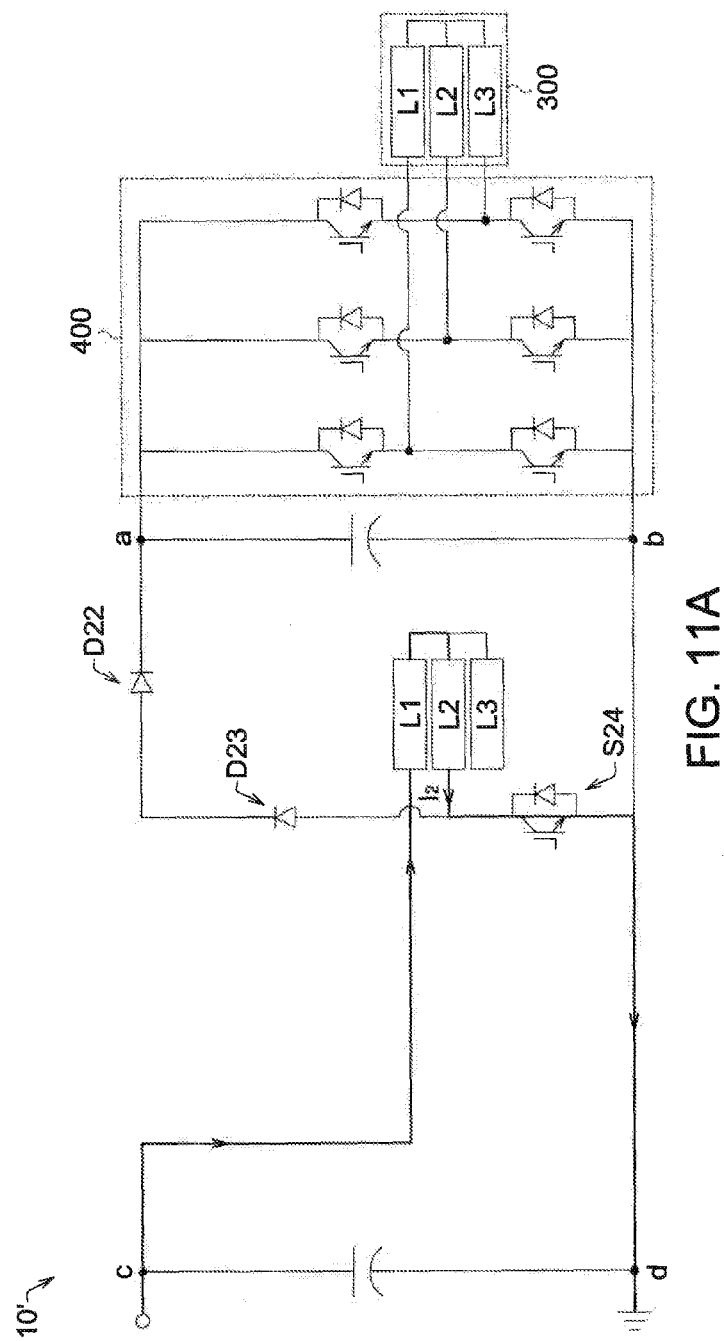
FIG. 11A shows an equivalent circuit diagram of the driving circuit when the multi-driving device of FIG. 8 is operated in one control method of the high speed.
Figure 11B:
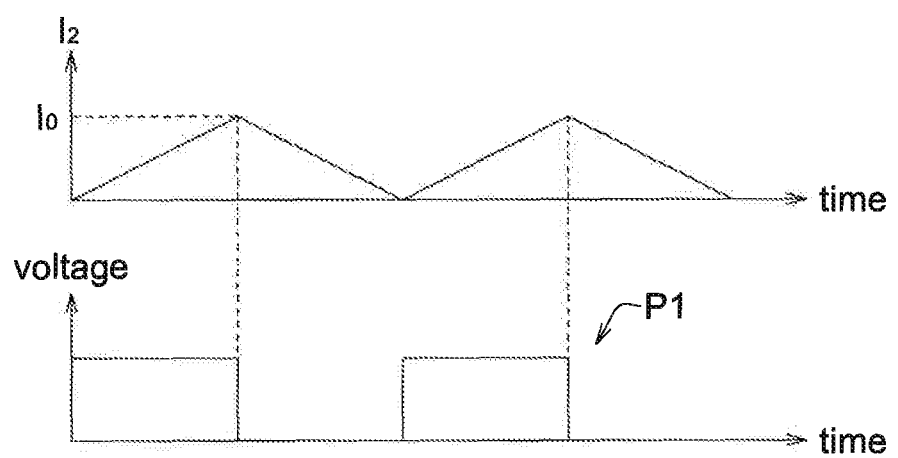
FIG. 11B shows a current path diagram of the driving circuit of FIG. 11A.
Figure 12A:
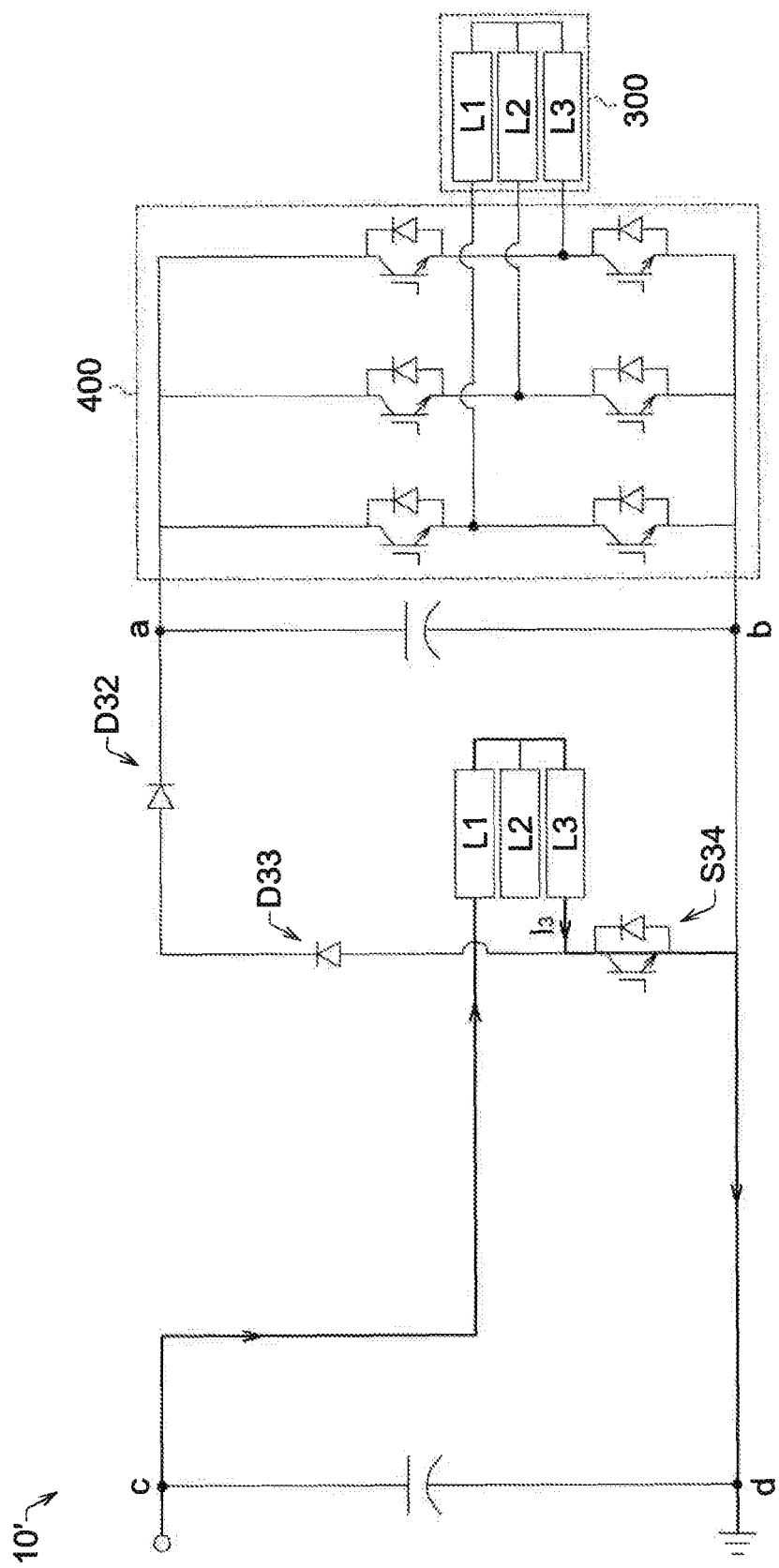
FIG. 12A shows an equivalent circuit diagram of the driving circuit when the multi-driving device of FIG. 8 is operated in another control method of the high speed.
Figure 12B:
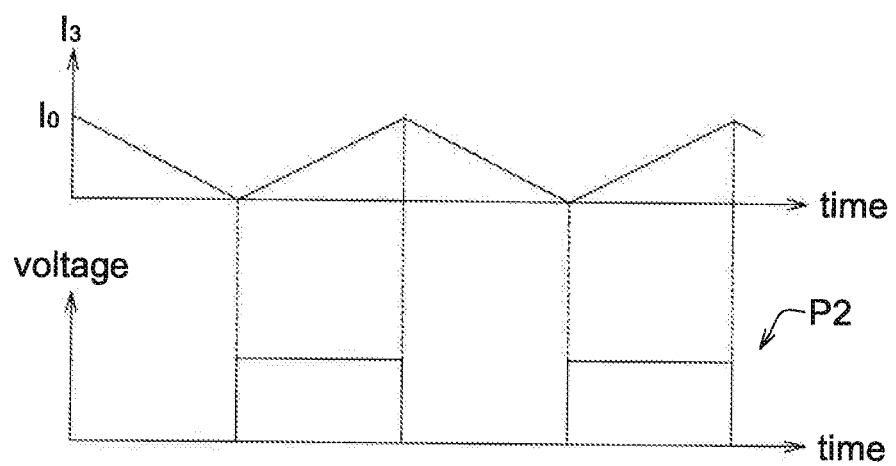
FIG. 12B shows a current path diagram of the driving circuit of FIG. 12A.

Referring to FIGS. 11A and 11B, wherein FIG. 11A shows an equivalent circuit diagram of the driving circuit when the multi-driving device of FIG. 8 is operated in one control method of the high speed, and FIG. 11B shows a current path diagram of the driving circuit of FIG. 11A. In present embodiment, (1). the fourth switch S34 (illustrated in FIG. 8) of the third switch group 230 is always turned off, and at least one of the second switch S32 (illustrated in FIG. 8) and the third switch S33 (illustrated in FIG. 8) of the third switch group 230 is always turned off, such that a circuit between the third inductor L3 and node a is open; (2) the fourth switch S24 of the second switch group 220 is controlled to periodically turned on or off by a PWM P1 (illustrated in FIG. 11B); (3). the second switch S22 and the third switch S23 of the second switch group 220 are simultaneously turned off, such that a diode D22 of the second switch S22 are serially connected to a diode D23 of the third switch S23 between node a and the fourth switch S24. As a result, a current I2 transmitted between the first inductor L1 and the second inductor L2 can be obtained. In another embodiment, only one of the second switch 822 and the third switch S23 of the second switch group 220 is turned off, and another of the second switch S22 and the third switch S23 of the second switch group 220 can be turned on or off, such that only one of the diode D23 of the second switch S22 and the diode D23 of the third switch S23 is coupled to between the node a and the fourth switch S24. In comparison with the diode D22 and D23 are serially connected between the node a and the fourth switch S24, the resistance is reduced since only one of the diode D22 and D23 is coupled to between the node a and the fourth switch S24. In another embodiment, different distribution of the current I2 can be obtained by changing waveform and/or phase of the PWM P1. Referring to FIGS. 12A and 12B, wherein FIG. 12A shows an equivalent circuit diagram of the driving circuit when the multi-driving device of FIG. 8 is operated in another control method of the high speed, and FIG. 12B shows a current path diagram of the driving circuit of FIG. 12A. In present embodiment, (1). the fourth switch S24 (illustrated in FIG. 8) of the second switch group 220 is always turned off, and at least one of the second switch S22 (illustrated in FIG. 8) and the third switch S23 (illustrated in FIG. 8) of the second switch group 220 is always turned off, such that a circuit between the second inductor L2 and the node a is open; (2) the fourth switch S34 of the third switch group 230 is controlled to periodically turned on or off by a PWM P2 (illustrated in FIG. 12B); (3). the second switch S32 and the third switch S33 of the third switch group 230 are simultaneously turned off, such that a diode D32 of the second switch S32 are serially connected to a diode D33 of the third switch S33 between node a and the fourth switch S24. As a result, a current I3 transmitted between the first inductor L1 and the third inductor L3 can be obtained. In another embodiment, only one of the second switch 32 and the third switch S33 of the third switch group 230 is turned off, and another of the second switch S32 and the third switch S33 of the third switch group 230 can be turned on or off, such that only one of the diode D32 of the second switch S32 and the diode D33 of the third switch S33 is coupled to between the node a and the fourth switch S34. In comparison with the diode D32 and D33 are serially connected between the node a and the fourth switch S34, the resistance is reduced since only one of the diode D32 and D33 is coupled to between the node a and the fourth switch S34. In another embodiment, different distribution of the current I3 can be obtained by changing waveform and/or phase of the PWM P2.

Figure 13A:
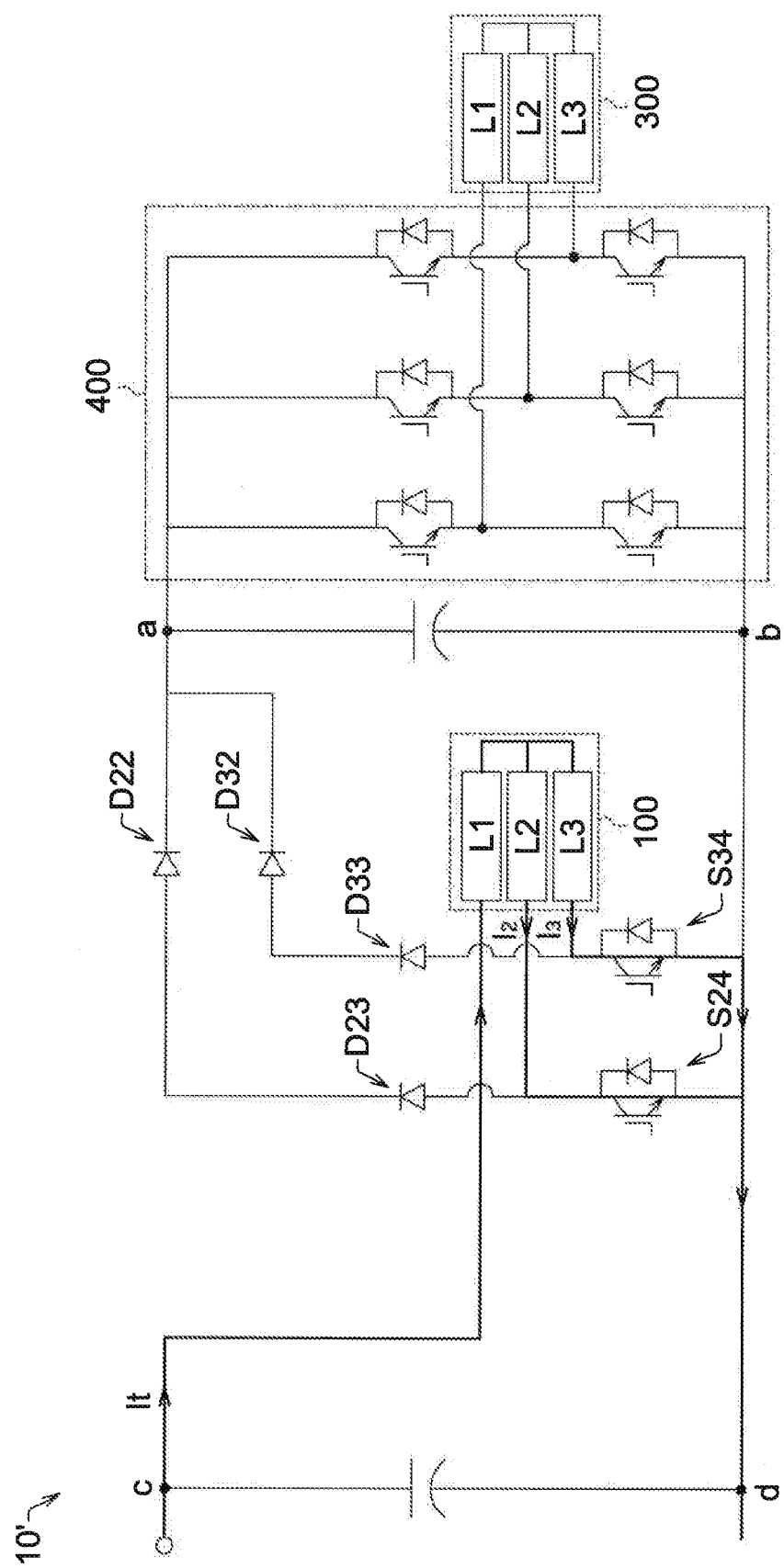
FIG. 13A shows an equivalent circuit diagram of the driving circuit when the multi-driving device of FIG. 8 is operated in another control method of the high speed.
Figure 13B:
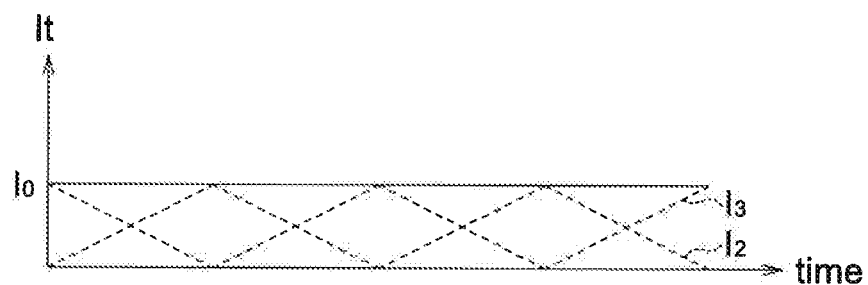
FIG. 13B shows a current path diagram of the driving circuit of FIG. 13A.

Referring to FIGS. 13A and 13B, wherein FIG. 13A shows an equivalent circuit diagram of the driving circuit when the multi-driving device of FIG. 8 is operated in another control method of the high speed, and FIG. 13B shows a current path diagram of the driving circuit of FIG. 13A. In present embodiment, the fourth switch S24 of the second switch group 220 is periodically turned on or off by the PWM P1 (illustrated in FIG. 11B), and the fourth switch S34 of the third switch group 230 is periodically turned on or off by the PWM P2 (illustrated in FIG. 12B), simultaneously. The control of other switch S22 and S23 are similar to that disclosed in FIG. 11A, the control of other switch S32 and S33 are similar to that disclosed in FIG. 12A, and the similarities are not repeated here. If a phase difference between the PWMs P1 and P2 is 180 degrees, the current I2 transmitted between the first inductor L1 and the second inductor L2 and the current I3 transmitted between the first inductor L1 and the third inductor L3 converges as a current It, as illustrated in FIG. 13B.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-driving device, comprising:
a first driving device comprising n inductors, wherein n is a positive integer equal to or larger than 3;
a second driving device; and
a driving circuit coupled to the first driving device and the second driving device and comprising n switch groups coupled in parallel, wherein each switch group comprises a first switch, a second switch, a third switch and a fourth switch, the first switch and the second switch are coupled in series, the third switch is serially coupled to the fourth switch and coupled between the first switch and the second switch, an $i^{th}$ inductor of the first driving device is coupled between the third switch and the fourth switch, and i ranges between 1 and n;
wherein, in a low speed mode, each first switch and each second switch are turned on; in a high speed mode, the first switch and the third switch of a first one of the n switch groups are turned on, the second switch and the fourth switch of the first one of the n switch groups are turned off, the first switch and the third switch of a second one of the n switch groups are turned off, the second switch of the second one of the n switch groups is turned on, and the fourth switch of the second one of the n switch groups is selectively turned on or off so as to raise the voltage of the second driving device.

2. The multi-driving device according to claim 1, wherein the fourth switch of the second one of the n switch groups is controlled by a pulse-width modulation (PWM) signal.

3. The multi-driving device according to claim 1, wherein the first switch, the second switch, the third switch and the fourth switch of each switch group are realized by relays, metal oxide semiconductor field effect transistors or insulated gate bipolar transistors.

4. The multi-driving device according to claim 1, wherein the first switches and the second switches which are turned off are realized by relays.

5. The multi-driving device according to claim 1, wherein the first driving device and the second driving device are realized by motors.

6. A driving circuit coupled to a first driving device and a second driving device, wherein the first driving device comprises n inductors, n is a positive integer equal to or larger than 3, and the driving circuit comprises:
n switch groups coupled in parallel, wherein each switch group comprises a first switch, a second switch, a third switch and a fourth switch, the first switch and the second switch are coupled in series, the third switch is serially coupled to the fourth switch and coupled between the first switch and the second switch, an $i^{th}$ inductor of the first driving device is coupled between the third switch and the fourth switch, and, i ranges between 1 and n;
wherein, in a low speed mode, each first switch and each second switch are turned on; in a high speed mode, the first switch and the third switch of a first one of the n switch groups are turned on, the second switch and the fourth switch of the first one of the n switch groups are turned off, the first switch and the third switch of a second one of the n switch groups are turned off, the second switch of the second one of the n switch groups is turned on, and the fourth switch of the second one of the n switch groups is selectively turned on or off so as to raise the voltage of the second driving device.

7. The driving circuit according to claim 6, wherein the fourth switch of the second one of the n switch groups is controlled by a PWM signal.

8. The driving circuit according to claim 6, wherein the first switch, the second switch, the third switch and the fourth switch of each switch group are realized by relays, metal oxide semiconductor field effect transistors or insulated gate bipolar transistors.

9. The driving circuit according to claim 6, wherein, the first switches and the second switches which are turned off are realized by relays.

10. The driving circuit according to claim 6, wherein, the first driving device and the second driving device are realized by motors.

11. A multi-driving device, comprising:
a first driving device comprising n inductors, wherein n is a positive integer equal to or larger than 3;
a second driving device; and
a driving circuit coupled to the first driving device and the second driving device and comprising n switch groups coupled in parallel, wherein each switch group comprises a first switch, a second switch, a third switch and a fourth switch, the first switch and the second switch are coupled in series, the third switch is serially coupled to the fourth switch and coupled between the first switch and the second switch, an $i^{th}$ inductor of the first driving device is coupled between the third switch and the fourth switch, and i ranges between 1 and n;

wherein, in a low speed mode, the first switch and the second switch of a first one of the n switch groups are turned on, the first switch of a second one of the n switch groups is turned off, the second switch of the second one of the n switch groups is turned on, the first switch of a third one of the n switch groups is turned off, and the second switch of the third one of the n switch groups is turned on;

in a high speed mode, the first switch of the first one of the n switch groups is turned on, the second switch of the first one of the n switch groups is turned off, the third switch of the first one of the n switch groups is turned on, the fourth switch of the first one of the n switch groups is turned off, the first switch of the second one of the n switch groups is turned off, and the first switch of the third one of the n switch groups is turned off; by controlling at least one of the fourth switch of the second one of the n switch groups and the fourth switch of the third one of the n switch groups to be turned on or off through a signal, so as to raise the voltage of the second driving device.

12. The multi-driving device according to claim 11, wherein a phase difference between a PWM signal for controlling the fourth switch of the second one of the n switch groups and a PWM signal for controlling the fourth switch of the third one of the n switch groups is 180 degrees.

13. The multi-driving device according to claim 11, wherein the fourth switch of the second one of the n switch groups is always turned off, at least one of the second switch and the third switch of the second one of the n switch groups is always turned off, the fourth switch of the third one of the n switch groups is controlled by a PWM, one of the second switch and the third switch of the third one of the n switch groups is turned off, and another of the second switch and the third switch of the third one of the n switch groups is turned on or off.

14. The multi-driving device according to claim 11, wherein the fourth switch of the third one of the n switch groups is always turned off, at least one of the second switch and the third switch of the third one of the n switch groups is always turned off, the fourth switch of the second one of the n switch groups is controlled by a PWM, one of the second switch and the third switch of the second one of the n switch groups is turned off, and another of the second switch and the third switch of the second one of the n switch groups is turned on or off.

15. The multi-driving device according to claim 11, wherein when the fourth switch of the second one of the n switch groups and the fourth switch of the third one of the n switch groups are controlled by PWMs, one of the second switch and the third switch of the second one of the n switch groups is turned off, another of the second switch and the third switch of the second one of the n switch groups is turned on or off, one of the second switch and the third switch of the third one of the n switch groups is turned off, and another of the second switch and the third switch of the third one of the n switch groups is turned on or off.

16. A driving circuit coupled to a first driving device and a second driving device, wherein the first driving device comprises n inductors, and n is a positive integer equal to or larger than 3 and the driving circuit comprises:

n switch groups coupled in parallel, wherein each switch group comprises a first switch, a second switch, a third switch and a fourth switch, the first switch and the second switch are coupled in series, the third switch is serially coupled to the fourth switch and coupled between the first switch and the second switch, an $i^{th}$ inductor of the first driving device is coupled between the third switch and the fourth switch, and i ranges between 1 and n;

wherein, in a low speed mode, the first switch and the second switch of a first one of the n switch groups are turned on, the first switch of a second one of the n switch groups is turned off, the second switch of the second one of the n switch groups is turned on, the first switch of a third one of the n switch groups is turned off, and the second switch of the third one of the n switch groups is turned on;

in a high speed mode, the first switch of the first one of the n switch groups is turned on, the second switch of the first one of the n switch groups is turned off, the third switch of the first one of the n switch groups is turned on, the fourth switch of the first one of the n switch groups is turned off, the first switch of the second one of the n switch groups is turned off, and the first switch of the third one of the n switch groups is turned off; by controlling at least one of the fourth switch of the second one of the n switch groups and the fourth switch of the third one of the n switch groups to be turned on or off through a signal, so as to raise the voltage of the second driving device.

17. The driving circuit according to claim 16, wherein a phase difference between a PWM signal for controlling the fourth switch of the second one of the n switch groups and a PWM signal for controlling the fourth switch of the third one of the n switch groups is 180 degrees.

18. The driving circuit according to claim 16, wherein the fourth switch of the second one of the n switch groups is always turned off, at least one of the second switch and the third switch of the second one of the n switch groups is always turned off, the fourth switch of the third one of the n switch groups is controlled by a PWM, one of the second switch and the third switch of the third one of the n switch groups is turned off, and another of the second switch and the third switch of the third one of the n switch groups is turned on or off.

19. The driving circuit according to claim 16, wherein the fourth switch of the third one of the n switch groups is always turned off, at least one of the second switch and the third switch of the third one of the n switch groups is always turned off, the fourth switch of the second one of the n switch groups is controlled by a PWM, one of the second switch and the third switch of the second one of the n switch groups is turned off, and another of the second switch and the third switch of the second one of the n switch groups is turned on or off.

20. The driving circuit according to claim 16, wherein when the fourth switch of the second one of the n switch groups and the fourth switch of the third one of the n switch groups are controlled by PWMs, one of the second switch and the third switch of the second one of the n switch groups is turned off, another of the second switch and the third switch of the second one of the n switch groups is turned on or off, one of the second switch and the third switch of the third one of the n switch groups is turned off, and another of the second switch and the third switch of the third one of the n switch groups is turned on or off.

* * * * *